US012762337B2

(12) United States Patent
Yarabolu

(10) Patent No.: US 12,762,337 B2
(45) Date of Patent: Oct. 13, 2026

(54) SECURE LARGE LANGUAGE MODEL DATA GATEWAY

(71) Applicant: Bank of America Corporation, Charlotte, NC (US)

(72) Inventor: Vijay Kumar Yarabolu, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 230 days.

(21) Appl. No.: 18/735,437

(22) Filed: Jun. 6, 2024

(65) Prior Publication Data

US 2025/0378268 A1 Dec. 11, 2025

(51) Int. Cl.
*G06F 40/20* (2020.01)
*G06F 21/62* (2013.01)

(52) U.S. Cl.
CPC .......... *G06F 40/20* (2020.01); *G06F 21/6218* (2013.01)

(58) Field of Classification Search
CPC ... G06F 40/20; G06F 21/6218; G06F 21/6254
USPC .............................................................. 704/9
See application file for complete search history.

(56) References Cited

U.S. PATENT DOCUMENTS

| | | | | |
|---|---|---|---|---|
| 11,126,798 | B1 | 9/2021 | Lewis Meza et al. | |
| 11,222,627 | B1 | 1/2022 | Qian et al. | |
| 12,627,475 | B2 * | 5/2026 | Eby | H04L 9/0825 |
| 2024/0333765 | A1 * | 10/2024 | McGrew | G06F 16/334 |
| 2024/0371510 | A1 * | 11/2024 | Aman | G16H 40/63 |
| 2025/0005650 | A1 * | 1/2025 | Chowdhury | G06Q 30/0633 |
| 2025/0111142 | A1 * | 4/2025 | Ferenczi | G06F 21/602 |
| 2025/0260562 | A1 * | 8/2025 | Edgin | G06F 40/20 |
| 2025/0307418 | A1 * | 10/2025 | Spencer | G06F 21/577 |
| 2025/0373414 | A1 * | 12/2025 | Eby | H04L 9/0825 |
| 2025/0378268 | A1 * | 12/2025 | Yarabolu | G06F 40/20 |

FOREIGN PATENT DOCUMENTS

| | | | | | |
|---|---|---|---|---|---|
| CN | 117272253 | A | * 12/2023 | | G06F 21/16 |
| CN | 117973488 | A | * 5/2024 | | G06F 21/6245 |
| CN | 118228302 | A | * 6/2024 | | G06N 3/045 |
| CN | 120658416 | A | * 9/2025 | | G06F 21/6245 |
| DE | 102023132888 | A1 | * 5/2025 | | G16H 50/70 |
| EP | 4621615 | A1 | * 9/2025 | | G06F 21/6245 |
| WO | WO-2024213840 | A1 | * 10/2024 | | H04L 9/3247 |
| WO | WO-2025212117 | A1 | * 10/2025 | | H04L 9/50 |

* cited by examiner

*Primary Examiner* — Edwin S Leland, III
(74) *Attorney, Agent, or Firm* — Banner & Witcoff, Ltd.

(57) ABSTRACT

Aspects of the disclosure relate to providing a secure large language model data platform. The secure large language model uses a machine-learning large language model and gateway to prevent attacks and unauthorized access to enterprise-managed information and resources. The secure large language model may utilize pre-enrollment at a secure gateway providing a unique identification to each client. A private/public key pair may be generated and stored in the secure gateway database and large language model respectively. In some embodiments, a unique anonymization rule set may be generated and used for each client. Threat actors cannot query the large language model directly based on the pre-enrollment process. Unauthorized requests cannot be decrypted by the large language model due to missing paired keys.

20 Claims, 9 Drawing Sheets

602

702

800

| Dynamic Rule Mapper for Each Client | | | | | | |
|---|---|---|---|---|---|---|
| **Data_Variables** | **Data_Type** | **Client-1** | **Client-2** | **Client-3** | **Client-N** |
| **Application_Id** | Text | Rule_12 | Rule_5 | Rule_18 | Rule_25 |
| **Income** | Numeric | Rule_14 | Rule_21 | Rule_8 | Rule_7 |
| **DOB** | Date_Time | Rule_16 | Rule_24 | Rule_12 | Rule_25 |
| **Loan Term** | Numeric | Rule_19 | Rule_2 | Rule_18 | Rule_20 |
| **Loan Amount** | Numeric | Rule_25 | Rule_11 | Rule_21 | Rule_3 |
| **Profession** | Text | Rule_25 | Rule_19 | Rule_10 | Rule_23 |
| **InterestRate** | Numeric | Rule_12 | Rule_17 | Rule_24 | Rule_1 |
| **CreditHistory** | Text | Rule_12 | Rule_6 | Rule_19 | Rule_2 |
| **GrantAmount** | Numeric | Rule_3 | Rule_17 | Rule_21 | Rule_20 |

802 804 806 808 810 812

Figure 8

SECURE LARGE LANGUAGE MODEL DATA GATEWAY

BACKGROUND

Aspects of the disclosure relate to protecting digital data processing systems, ensuring information security, and preventing attacks on enterprise computing resources. In particular, one or more aspects of the disclosure relate to providing a secure large language model to users while protecting enterprise-managed information and resources.

Organizations may utilize large artificial intelligence language models as they are powerful and versatile and can cater to a variety of user needs. Typically, these models are autonomous and have self-learning abilities that continuously evolve in real time using new data. These large language models reduce the need to build separate models for each business need. This monolithic approach reduces overall model development and maintenance costs. However, this monolithic approach is not ideal from a security standpoint because a breach of a large language model acts as a gateway to information and business logic across a wide area of an enterprise organization. Therefore, it is important to mitigate the risk of leakage to the external world without losing the power of the large language model.

SUMMARY

Aspects of the disclosure provide effective, efficient, scalable, and convenient technical solutions that address and overcome the technical problems associated with using autonomous, self-learning large language models by providing a secure large language model data platform. As illustrated in greater detail below, systems and methods implementing one or more aspects of the disclosure may utilize pre-enrollment at a secure gateway providing a unique identification to each user. A private/public key pair may be generated and stored in the secure gateway database and large language model respectively. In some embodiments, a unique anonymization rule set may be generated and used for each user. Threat actors cannot query the large language model directly based on the pre-enrollment process. Unauthorized requests cannot be decrypted by the large language model due to missing paired keys.

As illustrated in greater detail below, systems and methods implementing one or more aspects of the disclosure may utilize data (which may, e.g., include an organizing key factor data) to provide enhanced detection and security functions for preventing prompt injection attacks.

BRIEF DESCRIPTION OF THE DRAWINGS

The present disclosure is illustrated by way of example and not limited in the accompanying figures in which like reference numerals indicate similar elements and in which:

FIG. 8 depicts a rule mapping table for various clients, the rule mapping table listing specific rules that apply to various data variables for each client in accordance with one or more example embodiments.

These features, along with numerous others, are discussed in greater detail below.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired, or wireless, and that the specification is not intended to be limiting in this respect.

Some aspects of the disclosure relate to an artificial intelligence (AI) system that may be trained on external and internal learning sources that may include data from servers and/or systems, such as servers and/or systems that are operated by and/or otherwise associated with a financial institution. In some aspects of the disclosure, a large language model may be secured by a secure gateway that encrypts requests to the large language model and answers from the large language model. The gateway may use a private/public key combination to anonymize and deanonymize data.

Figure 1A:
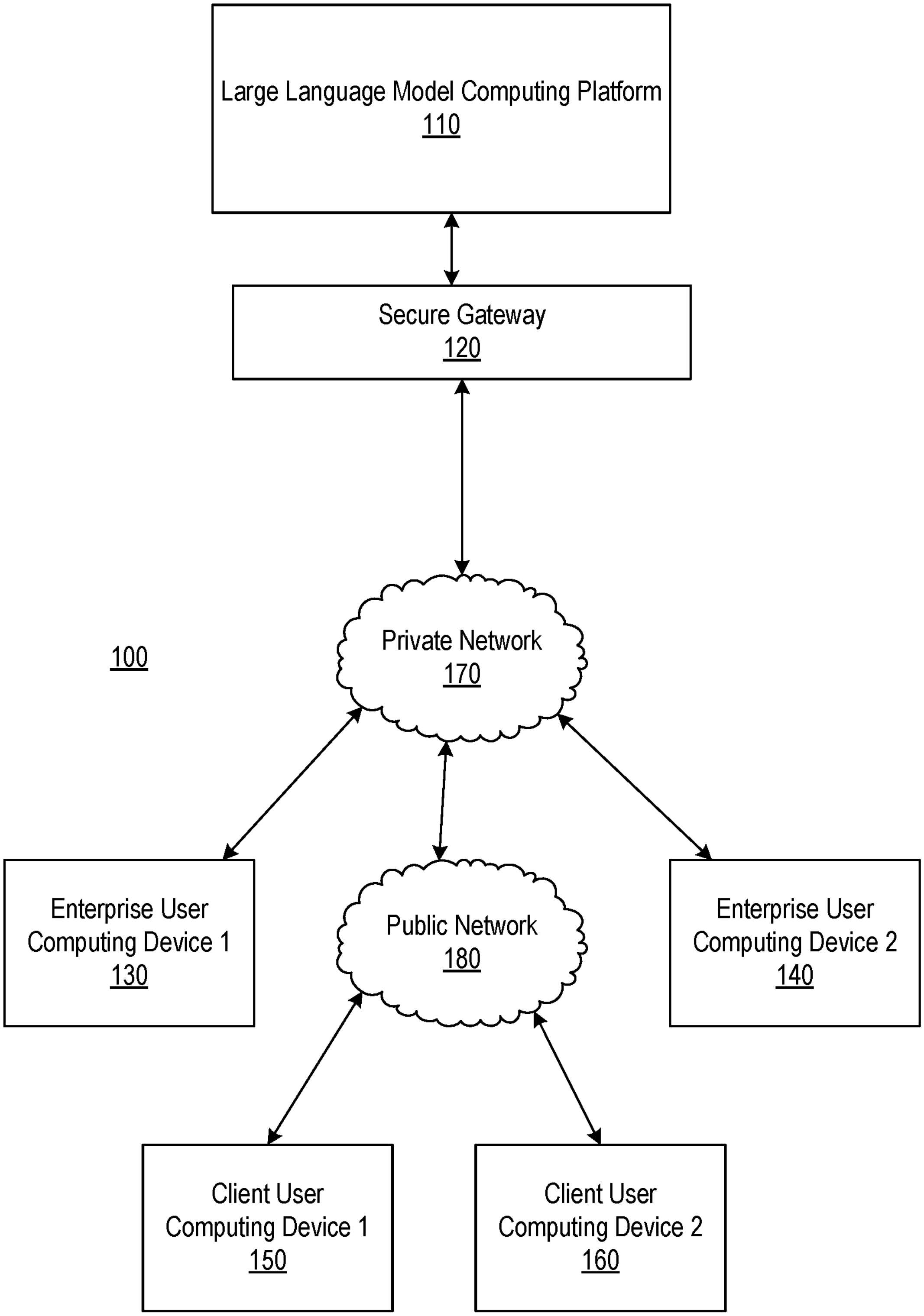
FIGS. 1A and 1B depict an illustrative computing environment for accessing a secure machine-learning large language model platform in accordance with one or more example embodiments.
Figure 1B:
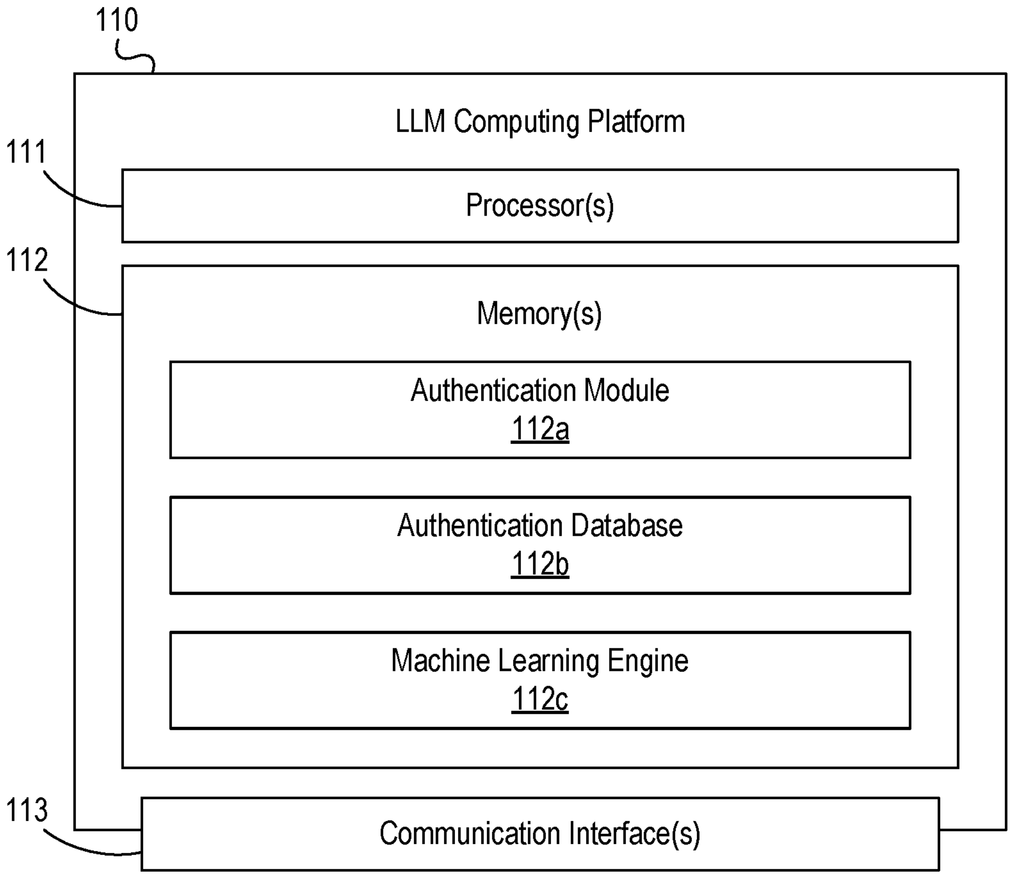

FIGS. 1A and 1B depict an illustrative computing environment for using machine-learning large language models to provide access to a large language model while protecting enterprise-managed information and resources in accordance with one or more example embodiments. Referring to FIG. 1A, computing environment 100 may include one or more computer systems. For example, computing environment 100 may include a large language model computing platform 110, a secure gateway 120, a first enterprise user computing device 130, a second enterprise user computing device 140, a first client user computing device 150, and a second client user computing device 160.

As illustrated in greater detail below, large language model computing platform 110 may include one or more computing devices configured to perform one or more of the functions described herein. For example, large language model computing platform 110 may include one or more computers (e.g., laptop computers, desktop computers, servers, server blades, or the like).

Large language model computing platform 110 may include one or more computing devices and/or other computer components (e.g., processors, memories, communication interfaces). In addition, and as illustrated in greater detail below, large language model computing platform 110 may be configured to provide various enterprise and/or back-office computing functions for an organization, such as a financial institution. For example, large language model computing platform 110 may include various servers and/or databases that store and/or otherwise maintain account information, such as financial account information including account balances, transaction history, account owner information, and/or other information. In addition, large language model computing platform 110 may process and/or otherwise execute transactions on specific accounts based on commands and/or other information received from other computer systems included in computing environment 100. Additionally or alternatively, large language model computing platform 110 may include various servers and/or databases that host and/or otherwise provide an online banking portal and/or one or more other websites, various servers and/or databases that host and/or otherwise provide a mobile banking portal and/or one or more other mobile applications, one or more interactive voice response (IVR) systems, and/or other systems.

Secure gateway 120 may include encryption and decryption hardware and software to anonymization data being transmitted to and received from large language model 110. In some embodiments, the secure gateway 150 converts data received from the large language model 110 to understandable information such as answers to requests to be transmitted to users for use.

Enterprise user computing device 130 may be a personal computing device (e.g., desktop computer, laptop computer) or mobile computing device (e.g., smartphone, tablet). In addition, enterprise user computing device 130 may be linked to and/or used by a specific enterprise user (who may, e.g., be an employee or other affiliate of an enterprise organization operating large language model computing platform 110). Enterprise user computing device 140 also may be a personal computing device (e.g., desktop computer, laptop computer) or mobile computing device (e.g., smartphone, tablet). In addition, enterprise user computing device 140 may be linked to and/or used by a specific enterprise user (who may, e.g., be an employee or other affiliate of an enterprise organization operating large language model computing platform 110) different from the user of enterprise user computing device 130.

Client user computing device 150 may be a personal computing device (e.g., desktop computer, laptop computer) or mobile computing device (e.g., smartphone, tablet). In addition, client user computing device 150 may be linked to and/or used by a specific non-enterprise user (who may, e.g., be a customer of an enterprise organization operating large language model computing platform 110). Client user computing device 160 also may be a personal computing device (e.g., desktop computer, laptop computer) or mobile computing device (e.g., smartphone, tablet). In addition, client user computing device 160 may be linked to and/or used by a specific non-enterprise user (who may, e.g., be a customer of an enterprise organization operating large language model computing platform 110) different from the user of client user computing device 150.

Computing environment 100 also may include one or more networks, which may interconnect one or more of large language model computing platform 110, enterprise computing infrastructure 120, enterprise user computing device 130, enterprise user computing device 140, client user computing device 150, and client user computing device 160. For example, computing environment 100 may include a private network 170 (which may, e.g., interconnect large language model computing platform 110, enterprise computing infrastructure 120, enterprise user computing device 130, enterprise user computing device 140, and/or one or more other systems which may be associated with an organization, such as a financial institution) and public network 180 (which may, e.g., interconnect client user computing device 150 and client user computing device 160 with private network 170 and/or one or more other systems, public networks, sub-networks, and/or the like).

In one or more arrangements, enterprise user computing device 130, enterprise user computing device 140, client user computing device 150, client user computing device 160, and/or the other systems included in computing environment 100 may be any type of computing device capable of receiving a user interface, receiving input via the user interface, and communicating the received input to one or more other computing devices. For example, enterprise user computing device 130, enterprise user computing device 140, client user computing device 150, client user computing device 160, and/or the other systems included in computing environment 100 may, in some instances, be and/or include server computers, desktop computers, laptop computers, tablet computers, smartphones, or the like that may include one or more processors, memories, communication interfaces, storage devices, and/or other components. As noted above, and as illustrated in greater detail below, any and/or all of large language model computing platform 110, enterprise computing infrastructure 120, enterprise user computing device 130, enterprise user computing device 140, client user computing device 150, and client user computing device 160 may, in some instances, be special-purpose computing devices configured to perform specific functions.

Referring to FIG. 1B, large language model computing platform 110 may include one or more processor(s) 111, memory(s) 112, and communication interface(s) 113. A data bus may interconnect processor 111, memory 112, and communication interface 113. Communication interface 113 may be a network interface configured to support communication between large language model computing platform 110 and one or more networks (e.g., network 170, network 180, or the like). Memory 112 may include one or more program modules and/or processing engines having instructions that when executed by processor 111 cause large language model computing platform 110 to perform one or more functions described herein and/or one or more databases that may store and/or otherwise maintain information which may be used by such program modules, processing engines, and/or processor 111. In some instances, the one or more program modules, processing engines, and/or databases may be stored by and/or maintained in different memory units of large language model computing platform 110 and/or by different computing devices that may form and/or otherwise make up large language model computing platform 110. For example, memory 112 may have, store, and/or include an authentication module **112*a*, an authentication database 112*b*, and a machine learning engine 112*c***.

Authentication module **112*a* may have instructions that direct and/or cause large language model computing platform 110 to use machine-learning models to authenticate received prompt requests, as discussed in greater detail below. Authentication database 112*b* may store information used by authentication module 112*a* and/or large language model computing platform 110 in using machine-learning models to segment and store prompt injection requests. Machine learning engine 112*c*** may perform and/or provide one or more artificial intelligence and/or machine learning functions and/or services, as illustrated in greater detail below.

Figure 2:
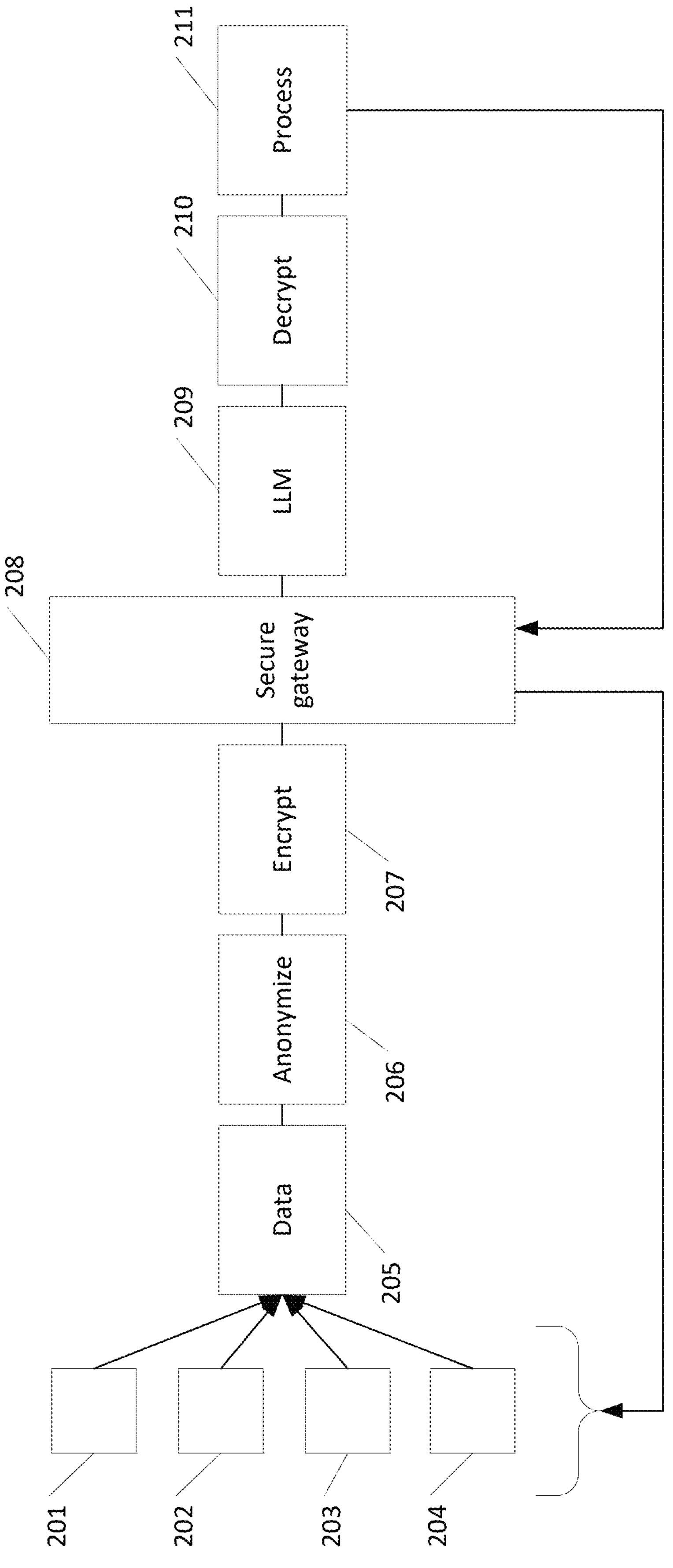
FIG. 2 depicts an illustrative flow diagram for a secure large language model platform in accordance with one or more example embodiments.

FIG. 2 depicts an illustrative flow diagram for a secure large language model located behind a secure gateway to protect enterprise data in accordance with one or more example embodiments. In FIG. 2, clients 201-204 provide data to be used by large language model computing platform 110, to provide results to queries from clients. Received data 205 may be anonymized by a security gateway 208 associated with large language model computing platform 110 and encrypted 207 by security gateway 208. Secure gateway 208 may be used to ensure that threat actors are unable to directly access large language model 209. Secure gateway 208 may ensure that all data transmitted to large language model 209 is first anonymized and then encrypted before transmitting to large language model 208. The encryption may include generation of a private/public key pair unique to each client. The keys may be stored in databases associated with secure gateway 208 and large language model 209. In some arrangements, large language model 209 decrypts the received encrypted anonymized data using the public key associated with the particular client.

In an embodiment of the disclosure, large language model 209 may process 211 the decrypted anonymized data to generate output to the received query. The output from large language model 209 may be encrypted and transmitted back to secure gateway 208. In some arrangements, secure gateway 208 may decrypt the received output and deanonymize the output so it may be forwarded back to client.

Figure 3:
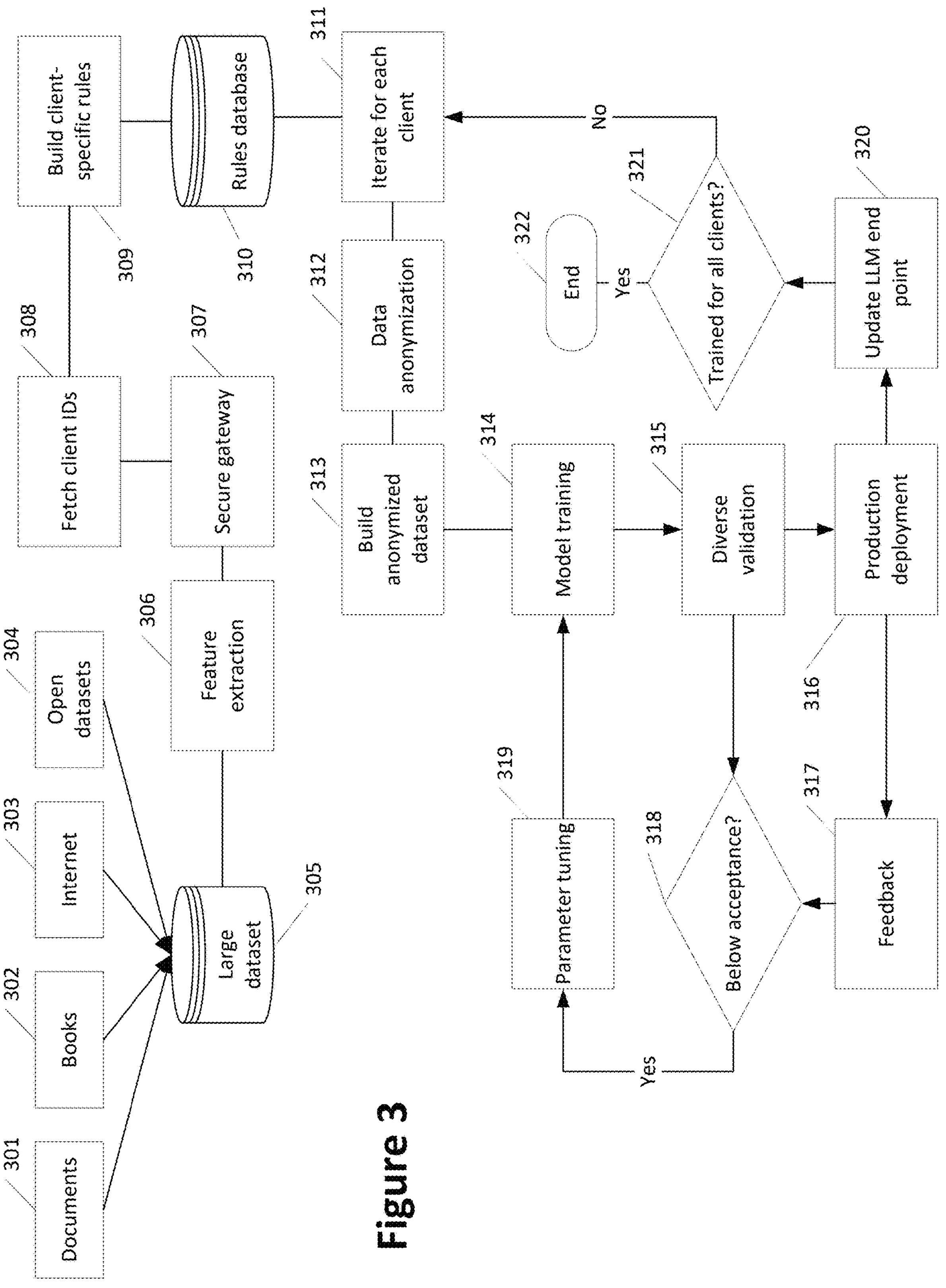
FIG. 3 depicts an illustrative flow diagram for training a secure large language model platform in accordance with one or more example embodiments.

FIG. 3 depicts an illustrative flow diagram for training a large language model associated with large language model platform 110 in accordance with one or more example embodiments. In FIG. 3, large datasets may be used train large language model 209. For instance, information sources such as documents 301, books 302, Internet data 303, and open datasets 304 may be used to form large datasets 305 for training large language model 209. In an embodiment, large language model platform 110 may include a feature extraction function 306. Secure gateway 307 may be used to enroll all clients accessing large language model platform 110. Large language model platform 110 may retrieve client identifications 308 so that large language model platform 110 may generate client specific rules 309 for each client.

An exemplary rule mapping table of different rule sets for different clients is shown in FIG. 8. For example, FIG. 8, illustrates, a rule mapping table 800 that lists for each client rules to be executed on different variables datasets so as to anonymize the data by the secure gateway 307 before transmitting to large language model. In an embodiment, large language model 209 receives anonymized data and executes functions based on each anonymized data determined by each client's specific rules. In an embodiment, large language model 209 may be shielded from threat actors and reverse engineering of decision logic may not be possible based on use of anonymized data.

In an aspect of the disclosure rule mapping table 800, may include a listing of data variables 802, associated datatypes for which different anonymized rules are generated and executed for various clients 806-812. For instance, as illustrated in mapping table 800 client 806, may utilize rule 12 for anonymizing the data variable application_Id and rule 14 for data variable Income. These rules may inject predetermined noise into client data so that threat actors cannot reverse engineer to determine actual data or large language model 209 decision logic.

Figure 6:
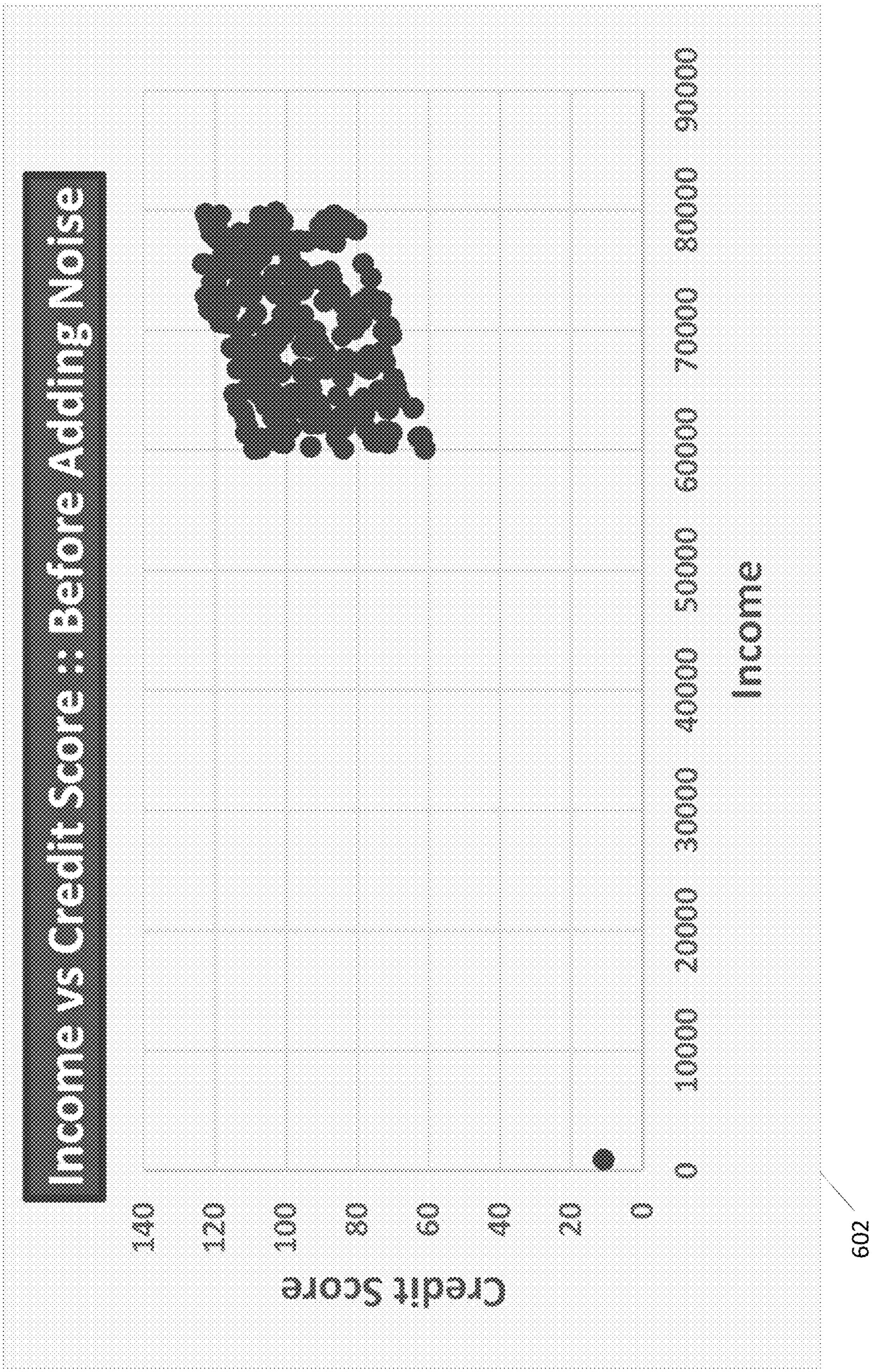
FIGS. 6-7 depict data before and after the application of client specific rule sets in accordance with one or more example embodiments.
Figure 7:
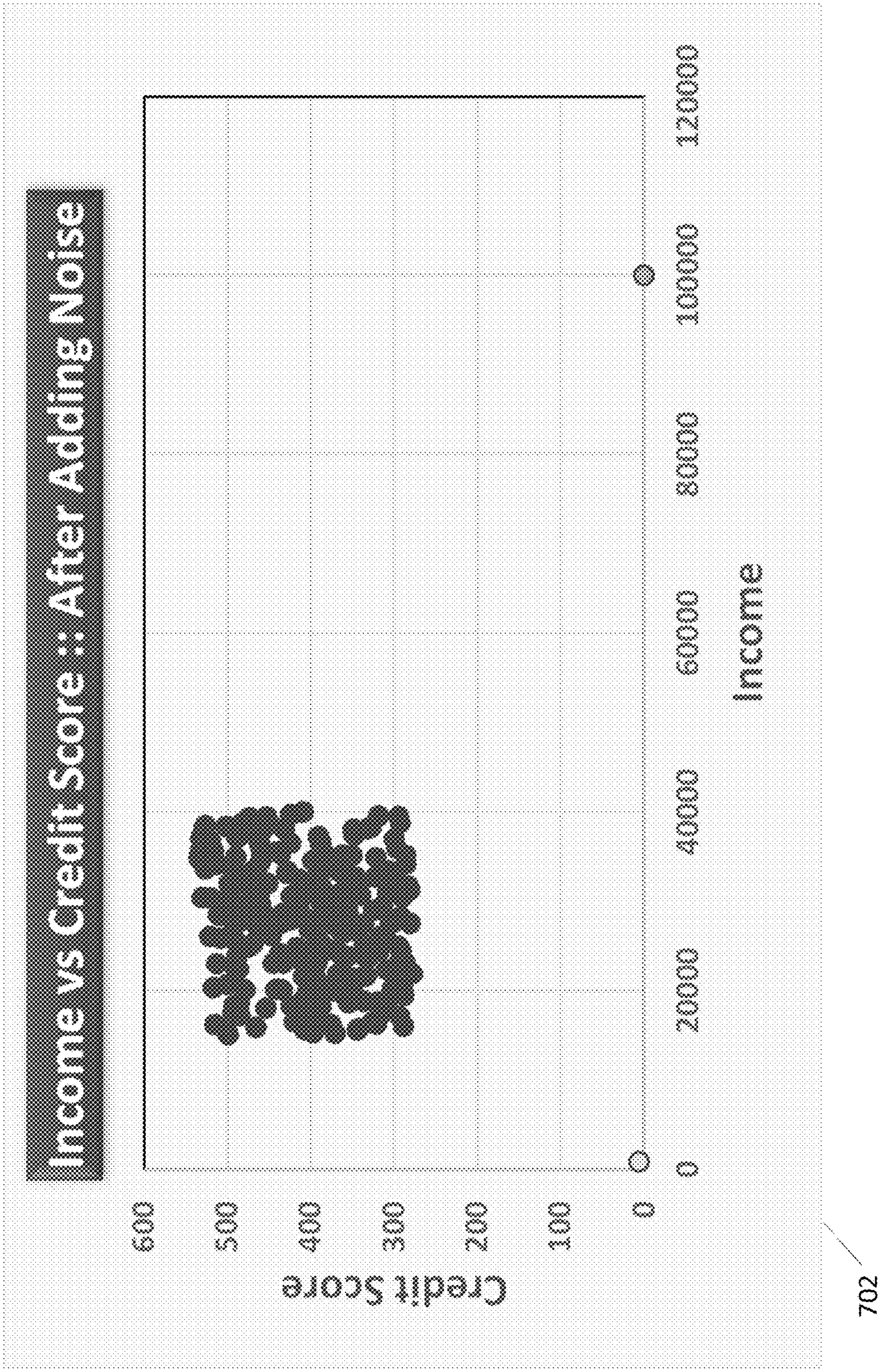

FIGS. 6-7 depict data before and after application of client specific data anonymization rules in accordance with one or more example embodiments. In particular, FIG. 6 illustrates enterprise confidential data 602 regarding client income versus credit scores before anonymization. FIG. 7 illustrates anonymized client data 702 after injection of noise defined by a predetermined rule to protect client information from threat actors. In an embodiment, theft of the anonymized data of FIG. 7 prevents threat actors from determining actual enterprise data without knowledge of the executed rule for the specific data variables.

Returning to FIG. 3, client specific rules may be stored in rules database 310. In some arrangements, large language model platform 110 may iterate so that large language model platform 110 determines client specific rules 309 for each client. Large language model platform 110 may at step 312, anonymize data for each client based on their determined rule set. An anonymized dataset 313 may be generated for each client. Large language model platform 110 may execute model training 314 and diverse validation methods 315 before releasing trained large language model into enterprise production 316. In an embodiment, large language model platform 110 may utilize feedback 317 and other performance criteria to determine if the trained model meets development acceptance criteria 318. Parameter fine tuning 319 of model may be executed based on performance criteria below a predetermined level.

Large language model platform 110 may in some arrangements, upon production deployment, update large language model end points 320. Large language model platform 110 may determine if all registered clients have been trained. The training process may repeat for each registered client and continually be updated based on client criteria and instructions.

Figure 4:
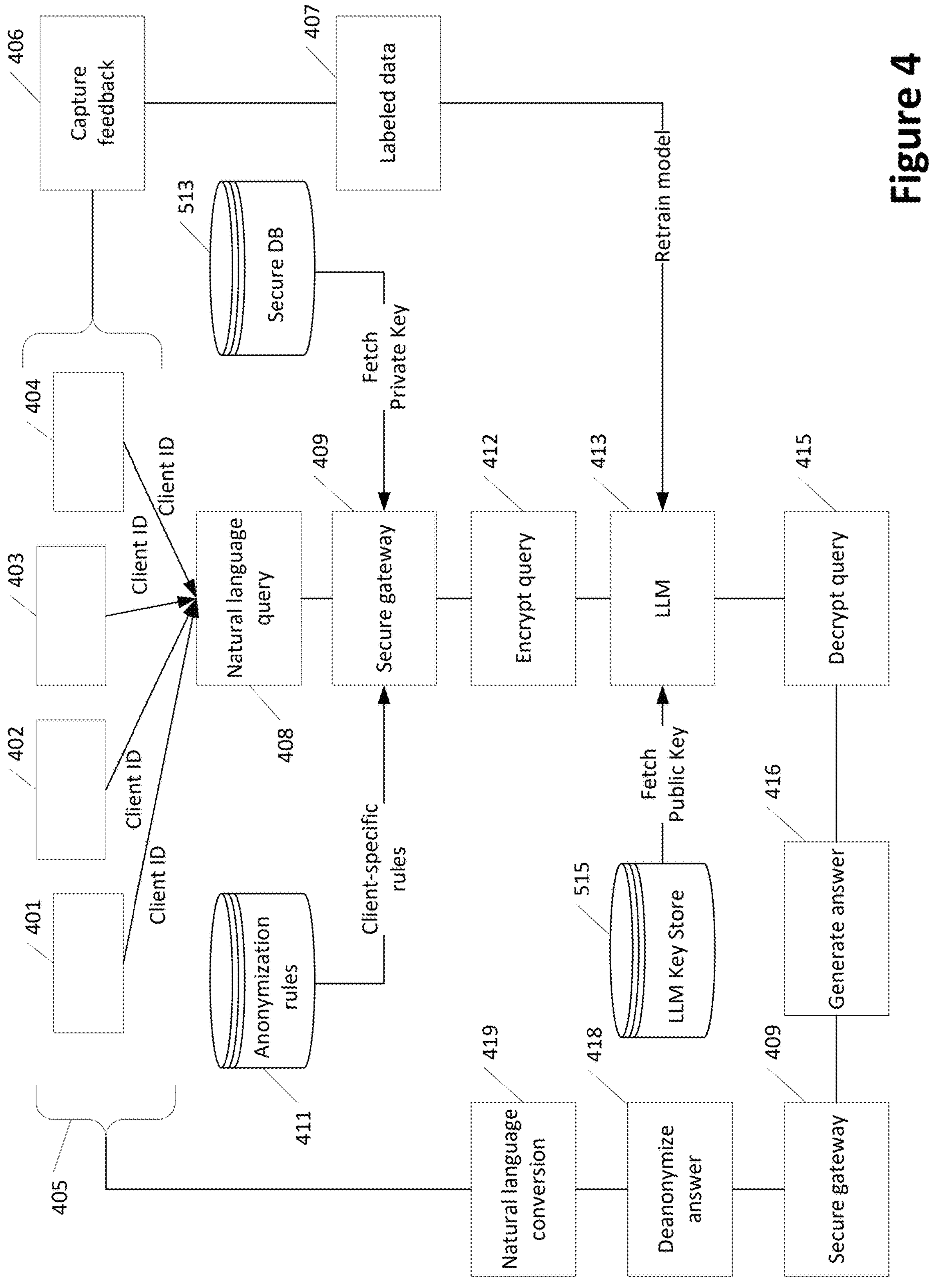
FIG. 4 depicts an illustrative flow diagram for querying a secure large language model platform in accordance with one or more example embodiments.
Figure 5:
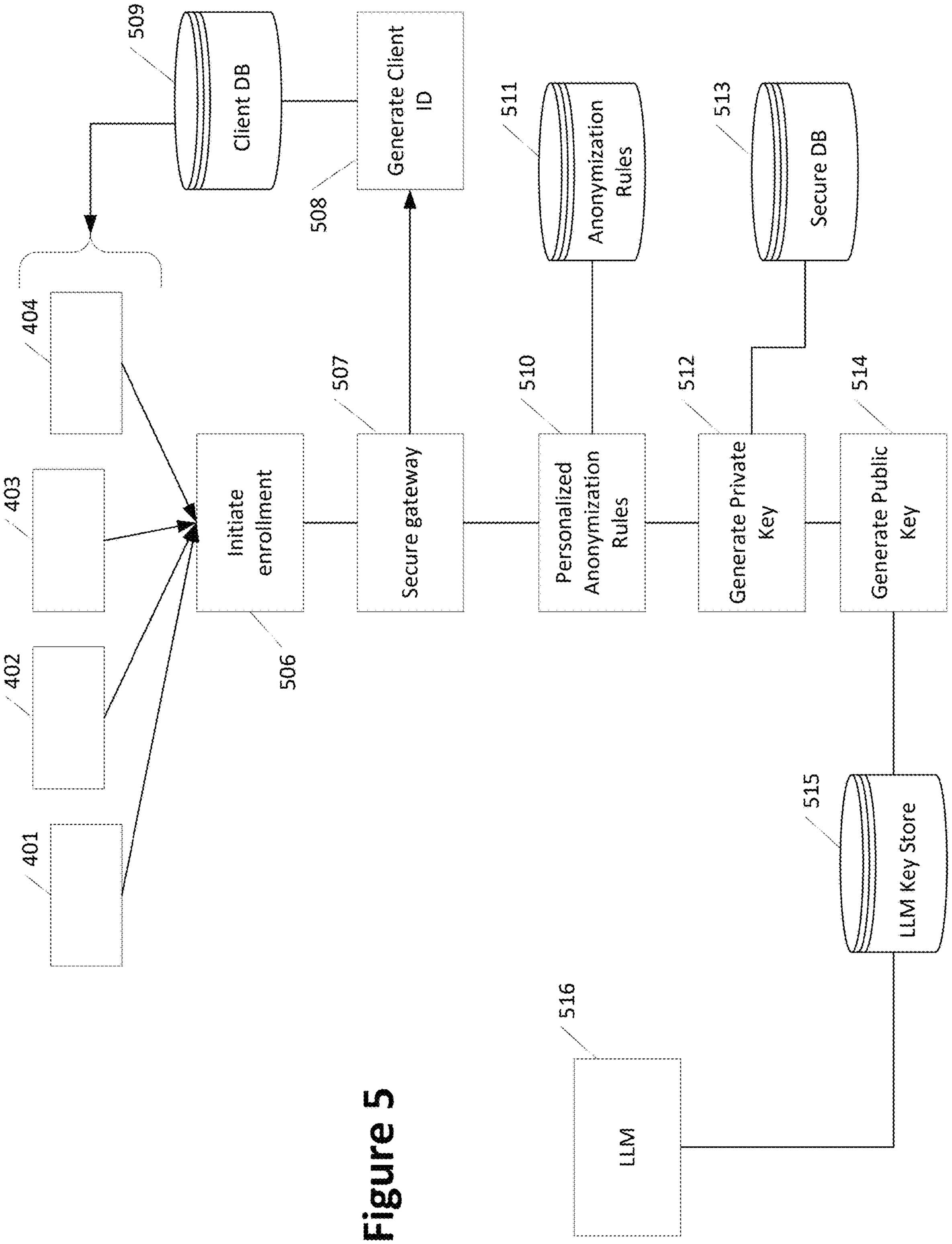
FIG. 5 depicts an illustrative enrollment process for a secure large language model platform in accordance with one or more example embodiments.

FIG. 4 depicts an illustrative flow diagram for interacting with large language model platform in accordance with one or more example embodiments. In FIG. 4, numerous clients 401-404 may interact with large language model platform 110 after an enrollment process illustrated in FIG. 5.

The enrollment process for large language model platform 110 clients 401-404 begins in step 506 where clients register with secure gateway 409. In an embodiment, secure gateway 409 generates 508 a unique client identification for each client. The generated client identifications are stored in a client identification database 509. In an embodiment, large language model platform 110 may retrieve client identifications so that large language model platform 110 may generate client specific anonymization rules 510 for each client. The generated client specific anonymization rules 510 may be included in a rule mapping table. In an embodiment, large language model 413 may be shielded from threat actors and reverse engineering of decision logic may not be possible based on use of anonymized data.

In some arrangements, secure gateway 409 may generate a private key for each client which may be stored in a secure databased 513. An associated public key may also be generated 514 by secure gateway 409 and stored 515 with large language model 413. The public/private key combinations may be utilized to encrypt/decrypt all anonymized data transmitted between secure gateway 409 and large language model 413.

Returning to FIG. 4, large language platform 110 may receive natural language queries 408 from clients 401-404. The natural language quires may include confidential enterprise data. Large language model platform 110 may determine the client identification associated with the received natural language query. Secure gateway 409 may determine client specific rules 411 associated with the determined client identification so that the client specific anonymization rules may be applied to the received query and included client confidential enterprise data. Secure gateway 409 using the determined client anonymization rules may anonymize the data prior to encryption. The encryption may utilize the private key associated with the client retrieved from secure database 513.

In some arrangements, secure gateway 409 encrypts the anonymized data query and transmits the encrypted information to large language model 413. In an embodiment, large language model 413 retrieves 414 the associated public key from the large language model key database 515. In an embodiment, large language model 413 may use the public key to decrypt 415 the anonymized query and included client confidential data.

Large language model 413 may generate output that includes a response 416 to the decrypted query and transmit the response to secure gateway 409. In another embodiment, output from the large language model 413 may also be encrypted before transmitting to secure gateway 409. Secure gateway 409 may deanonymize the response 418 and covert the response to natural language 419 so response is available to requesting client. In some additional embodiments, client feedback data may be captured 406 and labeled 407 to retrain and update large language model 413.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer-executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any, and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:
- at least one processor;
- a communication interface communicatively coupled to the at least one processor; and
- memory storing computer-readable instructions that, when executed by the at least one processor, cause the computing platform to:
  - receive a natural language request at a secure gateway;
  - determine a client identification for the received natural language request;
  - based on the determined client identification, determine anonymization rules and an associated private key for client, wherein the private key is stored at the secure gateway and a corresponding public key is stored at the large language model;
  - anonymize the natural language request;
  - encrypt the anonymized natural language request using the private key;
  - transmit the encrypted anonymized natural language request to a large language model for execution of the natural language request;
  - at the large language model, decrypt the anonymized natural language request using the public key;
  - generate output responsive to the anonymized natural language request;
  - transmit generated output to the secure gateway;
  - deanonymize the generated output at the secure gateway;
  - convert the deanonymized generated output into a natural language output responsive to the natural language request; and
  - transmit the natural language output responsive to the natural language request.

2. The computing platform of claim 1, wherein the memory stores additional computer-readable instructions that, when executed by the at least one processor, cause the computing platform to:
- initiate enrollment by the client with the secure gateway, the enrollment generating a unique client identification.

3. The computing platform of claim 2, wherein the initiated enrollment comprises determining at least one anonymization rule for client data.

4. The computing platform of claim 3, wherein the initiated enrollment comprises generating at least one private and public key combination associated with the client.

5. The computing platform of claim 3, wherein the memory stores additional computer-readable instructions that, when executed by the at least one processor, cause the computing platform to:

generating a rule mapping table, the rule mapping table listing specific rules that apply to various data variables for the client.

6. The computing platform of claim 5, wherein the rule mapping table comprises a listing of client rules associated with different data variables.

7. The computing platform of claim 6, wherein the rule mapping table comprises a data type for each of the listed data variables.

8. A method, comprising:

at a computing platform comprising at least one processor, a communication interface, and memory:

receive a natural language request at a secure gateway;

determine a client identification for the received natural language request;

based on the determined client identification, determine anonymization rules and an associated private key for client, wherein the private key is stored at the secure gateway and a corresponding public key is stored at the large language model;

anonymize the natural language request;

encrypt the anonymized natural language request using the private key;

transmit the encrypted anonymized natural language request to a large language model for execution of the natural language request;

at the large language model, decrypt the anonymized natural language request using the public key;

generate output responsive to the anonymized natural language request;

transmit generated output to the secure gateway;

deanonymize the generated output at the secure gateway;

convert the deanonymized generated output into a natural language output responsive to the natural language request; and transmit the natural language output responsive to the natural language request.

9. The method of claim 8, the computer platform further comprising:

initiating enrollment by the client with the secure gateway, the enrollment generating a unique client identification.

10. The method of claim 9, wherein initiating enrollment comprises determining at least one anonymization rule for client data.

11. The method of claim 10, wherein the initiating enrollment comprises generating at least one private and public key combination associated with the client.

12. The method of claim 10, the computer platform further comprising:

generating a rule mapping table, the rule mapping table listing specific rules that apply to various data variables for the client.

13. The method of claim 12, wherein the rule mapping table comprises a listing of client rules associated with different data variables.

14. The method of claim 13, wherein the rule mapping table comprises a data type for each of the listed data variables.

15. One or more non-transitory computer-readable media storing instructions that, when executed by a computing platform comprising at least one processor, a communication interface, and memory, cause the computing platform to:

receive a natural language request at a secure gateway;

determine a client identification for the received natural language request;

based on the determined client identification, determine anonymization rules and an associated private key for client, wherein the private key is stored at the secure gateway and a corresponding public key is stored at the large language model;

anonymize the natural language request;

encrypt the anonymized natural language request using the private key;

transmit the encrypted anonymized natural language request to a large language model for execution of the natural language request;

at the large language model, decrypt the anonymized natural language request using the public key;

generate output responsive to the anonymized natural language request;

transmit generated output to the secure gateway;

deanonymize the generated output at the secure gateway;

convert the deanonymized generated output into a natural language output responsive to the natural language request; and transmit the natural language output responsive to the natural language request.

16. The one or more non-transitory computer-readable media storing instructions of claim 15, when executed by a computing platform comprising at least one processor, a communication interface, and memory, cause the computing platform to:

initiate enrollment by the client with the secure gateway, the enrollment generating a unique client identification.

17. The one or more non-transitory computer-readable media storing instructions of claim 16, wherein the initiated enrollment comprises determining at least one anonymization rule for client data.

18. The one or more non-transitory computer-readable media storing instructions of claim 17, wherein the initiated enrollment comprises generating at least one private and public key combination associated with the client.

19. The one or more non-transitory computer-readable media storing instructions of claim 17, when executed by a computing platform comprising at least one processor, a communication interface, and memory, cause the computing platform to:

generate a rule mapping table, the rule mapping table listing specific rules that apply to various data variables for the client.

20. The one or more non-transitory computer-readable media storing instructions of claim 19, wherein the rule mapping table comprises a listing of client rules associated with different data variables.

* * * * *